United States Patent
Saviers et al.

(10) Patent No.: US 11,804,754 B2
(45) Date of Patent: Oct. 31, 2023

(54) TWO-PHASE THERMAL MANAGEMENT SYSTEM WITH ACTIVE CONTROL FOR HIGH DENSITY ELECTRIC MACHINE

(71) Applicant: Hamilton Sundstrand Corporation, Charlotte, NC (US)

(72) Inventors: Kimberly Rae Saviers, Glastonbury, CT (US); Abbas A. Alahyari, Glastonbury, CT (US); Aritra Sur, Manchester, CT (US); Jagadeesh Kumar Tangudu, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 194 days.

(21) Appl. No.: 17/126,605

(22) Filed: Dec. 18, 2020

(65) Prior Publication Data
US 2022/0200407 A1   Jun. 23, 2022

(51) Int. Cl.
*H02K 9/20*     (2006.01)
*H02K 11/33*    (2016.01)
(Continued)

(52) U.S. Cl.
CPC ............... *H02K 9/20* (2013.01); *F25B 43/02* (2013.01); *H02K 7/116* (2013.01); *H02K 11/33* (2016.01)

(58) Field of Classification Search
CPC .. H02K 5/00; H02K 5/18; H02K 5/20; H02K 7/00; H02K 7/003; H02K 7/11;
(Continued)

(56) References Cited

U.S. PATENT DOCUMENTS 3,715,610 A * 2/1973 Brinkman .............. H02K 9/225
                                                        310/58
6,515,383 B1   2/2003 Ognibene et al.
(Continued)

FOREIGN PATENT DOCUMENTS

CN   101546941 A   9/2009
CN   106533034 A   3/2017
(Continued)

OTHER PUBLICATIONS

Extended European Search Report for EP Application No. 21210274.3, dated May 6, 2022, pp. 1-7.

*Primary Examiner* — Tran N Nguyen
(74) *Attorney, Agent, or Firm* — CANTOR COLBURN LLP

(57) ABSTRACT

An electric motor system includes an electric motor, and a thermal management system. The thermal management system includes a two-phase refrigerant circuit circulating a flow of refrigerant through the electric motor, and a refrigerant-air heat exchanger fluidly connected to the electric motor via the two-phase refrigerant circuit, such that the flow of refrigerant is boiled via heat generated by the electric motor, and returned to a subcooled liquid state to cool the electric motor. A method of dissipating thermal energy from an electric motor includes urging a flow of refrigerant through an electric motor, thereby boiling the flow of refrigerant, directing the flow of refrigerant from the electric motor to a refrigerant-air heat exchanger via a two-phase refrigerant circuit, and cooling the refrigerant to a subcooled liquid state at the refrigerant-air heat exchanger via thermal energy exchange with a flow of air through the refrigerant-air heat exchanger.

15 Claims, 4 Drawing Sheets

(51) Int. Cl.
*F25B 43/02* (2006.01)
*H02K 7/116* (2006.01)

(58) Field of Classification Search
CPC .......... H02K 7/116; H02K 7/14; H02K 11/00; H02K 11/21; H02K 11/215; H02K 11/25; H02K 11/33; H02K 9/00; H02K 9/06; H02K 9/10; H02K 9/14; H02K 9/19; H02K 9/20; H02K 9/22; H02K 9/223; H02K 9/225; H02K 9/227; F25B 43/00; F25B 43/02

See application file for complete search history.

(56) References Cited

U.S. PATENT DOCUMENTS

| | | | |
|---|---|---|---|
| 8,336,319 B2 | 12/2012 | Johnston et al. | |
| 9,649,909 B2 | 5/2017 | Enomoto et al. | |
| 10,734,867 B2 | 8/2020 | Tang et al. | |
| 10,784,750 B2 | 9/2020 | Gerstler et al. | |
| 2008/0217469 A1* | 9/2008 | Houver | B64D 33/10 62/157 |
| 2014/0134014 A1* | 5/2014 | Mera | F04C 29/045 417/371 |
| 2014/0311704 A1 | 10/2014 | Yokoyama et al. | |
| 2015/0318772 A1* | 11/2015 | Jahshan | H02K 3/04 318/400.41 |
| 2017/0291482 A1 | 10/2017 | Pearce, Jr. et al. | |
| 2019/0386542 A1 | 12/2019 | Shiraki et al. | |

FOREIGN PATENT DOCUMENTS

| | | |
|---|---|---|
| CN | 107070022 A | 8/2017 |
| CN | 108566024 A | 9/2018 |
| CN | 109361293 A | 2/2019 |
| CN | 110784069 A | 2/2020 |
| DE | 102018209340 B3 | 4/2019 |
| WO | 2018024699 A1 | 2/2018 |

* cited by examiner

TWO-PHASE THERMAL MANAGEMENT SYSTEM WITH ACTIVE CONTROL FOR HIGH DENSITY ELECTRIC MACHINE

BACKGROUND

Exemplary embodiments pertain to the art of electric machines, and more particularly to thermal management of electric machines.

Electric machines, such as electric motors, along with their associated motor drives, generate heat during operation. Traditional motor thermal management is often in the form of external fins at the motor to dissipate heat via airflow past the motor, or through liquid cooling jackets applied to the motor. Now that motors with high power densities are now being developed, however, the thermal management system must be highly effective, due to increased heat generated by such motors. Further, it is desired that such thermal management systems be compatible with flight conditions for use on, for example, aircraft.

BRIEF DESCRIPTION

In one embodiment, an electric motor system includes an electric motor, and a thermal management system. The thermal management system includes a two-phase refrigerant circuit circulating a flow of refrigerant through the electric motor, and a refrigerant-air heat exchanger fluidly connected to the electric motor via the two-phase refrigerant circuit, such that the flow of refrigerant is boiled via heat generated by the electric motor, and returned to a subcooled liquid state to cool the electric motor.

Additionally or alternatively, in this or other embodiments a motor drive is operably connected to the electric motor and fluidly connected to the refrigerant-air heat exchanger via the two-phase refrigerant circuit such that the flow of refrigerant cools the motor drive.

Additionally or alternatively, in this or other embodiments the electric motor and the motor drive are fluidly connected to the two-phase refrigerant in a parallel relationship.

Additionally or alternatively, in this or other embodiments the electric motor and the motor drive are fluidly connected to the two-phase refrigerant in a serial relationship.

Additionally or alternatively, in this or other embodiments one or more sensors are located along the two-phase refrigerant circuit to detect one or more flow conditions of the flow of refrigerant. One or more valves are configured to regulate the flow of refrigerant through the electric motor and the motor drive, and a controller is operably connected to the one or more sensors and the one or more valves. The controller is configured to operate the one or more valves in response to the detected one or more flow conditions.

Additionally or alternatively, in this or other embodiments the one or more flow conditions include one or more of temperature or pressure of the flow of refrigerant.

Additionally or alternatively, in this or other embodiments a gear box is operably connected to the electric motor, and a lubricant circuit circulates a flow of lubricant through the gear box. The lubricant circuit circulates the flow of lubricant through the refrigerant-air heat exchanger, such that the flow of lubricant is cooled at the refrigerant-air heat exchanger prior to being returned to the gear box.

Additionally or alternatively, in this or other embodiments a refrigerant reservoir is located along the refrigerant circuit downstream of the refrigerant-air heat exchanger.

Additionally or alternatively, in this or other embodiments a bypass passage allows for selective bypass of the refrigerant reservoir by the flow of refrigerant.

Additionally or alternatively, in this or other embodiments the flow of refrigerant is a dielectric refrigerant.

In another embodiment, a method of dissipating thermal energy from an electric motor includes urging a flow of refrigerant through an electric motor, thereby boiling the flow of refrigerant, directing the flow of refrigerant from the electric motor to a refrigerant-air heat exchanger via a two-phase refrigerant circuit, and cooling the refrigerant to a sub-cooled liquid state at the refrigerant-air heat exchanger via thermal energy exchange with a flow of air through the refrigerant-air heat exchanger.

Additionally or alternatively, in this or other embodiments at least a portion of the flow of refrigerant is directed through a motor drive operably connected to the electric motor and fluidly connected to the refrigerant-air heat exchanger via the two-phase refrigerant circuit such that the flow of refrigerant cools the motor drive.

Additionally or alternatively, in this or other embodiments the electric motor and the motor drive are fluidly connected to the two-phase refrigerant circuit in a parallel relationship.

Additionally or alternatively, in this or other embodiments one or more flow conditions of the flow of refrigerant are detected via one or more sensors disposed along the two-phase refrigerant circuit, and one or more valves are operated to regulate the flow of refrigerant through the electric motor and the motor drive based on the one or more flow conditions.

Additionally or alternatively, in this or other embodiments the one or more flow conditions are one or more of pressure or temperature of the flow of refrigerant.

Additionally or alternatively, in this or other embodiments a flow of lubricant is flowed through a gear box operably connected to the electric motor, the flow of lubricant is directed from the gear box to the refrigerant-air heat exchanger via a lubricant circuit, and the lubricant is cooled at the refrigerant-air heat exchanger via thermal energy exchange with a flow of air through the refrigerant-air heat exchanger.

In yet another embodiment, a thermal management system for an electric motor system includes a refrigerant-air heat exchanger, a two-phase refrigerant circuit fluidly connected to the refrigerant-air heat exchanger and to an electric motor. A flow of refrigerant circulates through the refrigerant circuit to cool the electric motor. A lubricant circuit is fluidly connected to the refrigerant-air heat exchanger and to a gear box operably connected to the electric motor. A flow of lubricant circulates through the lubricant circuit and is cooled at the refrigerant-air heat exchanger.

Additionally or alternatively, in this or other embodiments the two-phase refrigerant circuit is fluidly connected to a motor drive operably connected to the electric motor. At least a portion of the flow of refrigerant is directed through the motor drive to cool the motor drive.

Additionally or alternatively, in this or other embodiments one or more sensors are located along the two-phase refrigerant circuit to detect one or more flow conditions of the flow of refrigerant, one or more valves configured to regulate the flow of refrigerant through the electric motor and the motor drive, and a controller operably connected to the one or more sensors and the one or more valves, the controller configured to operate the one or more valves in response to the detected one or more flow conditions.

Additionally or alternatively, in this or other embodiments the one or more flow conditions include one or more of temperature or pressure of the flow of refrigerant.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
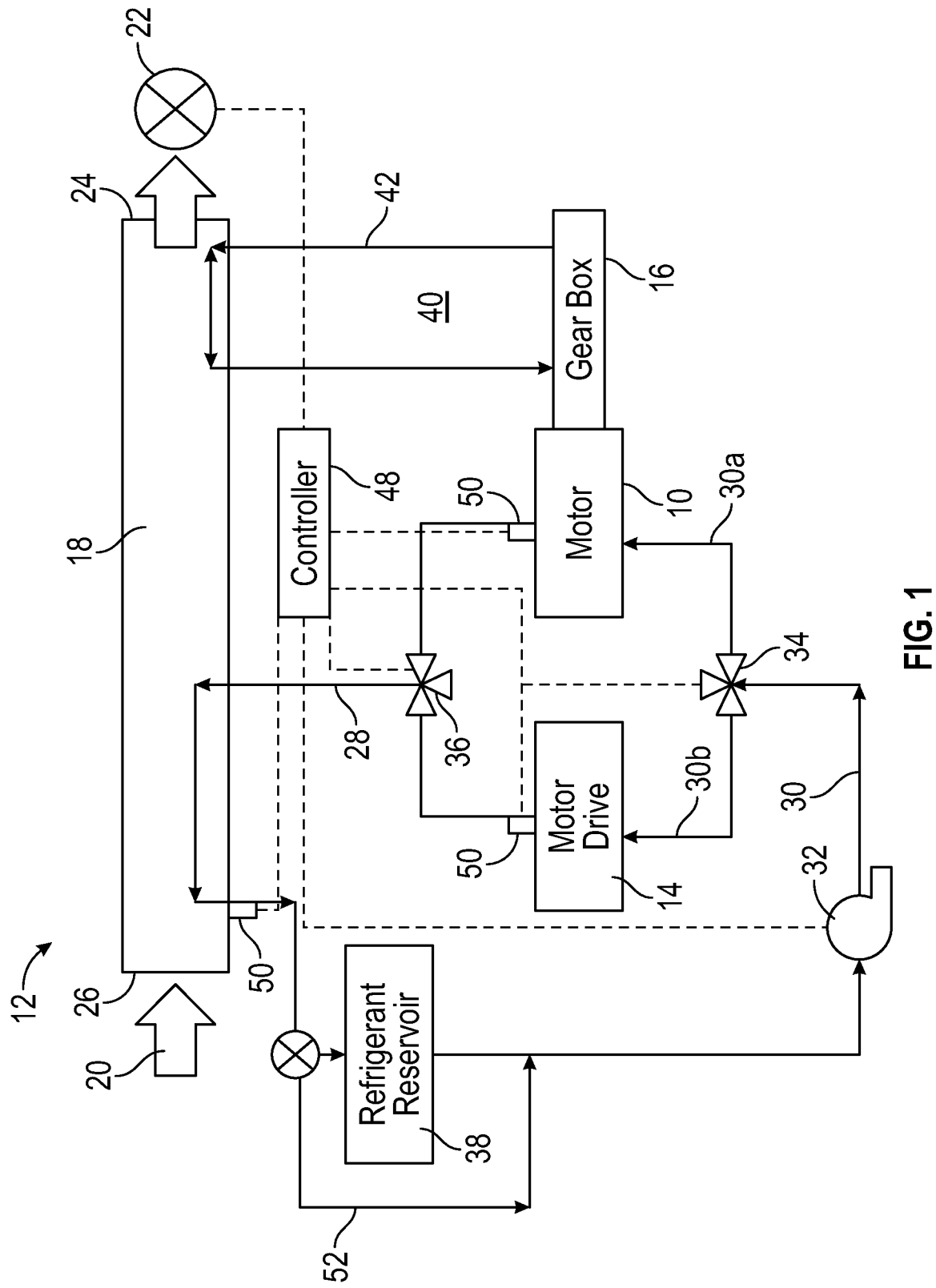
FIG. 1 is a schematic illustration of an embodiment of a thermal management system for an electric motor.

Illustrated in FIG. 1 is an electric motor 10 and a thermal management system (TMS) 12 for the electric motor 10. The electric motor 10 is controlled by a motor drive 14 operably connected to the electric motor 10 and may also include a gearbox 16 connected to the electric motor 10. Each of the electric motor 10, the motor drive 14 and the gearbox 16 generate heat during operation to be dissipated by the TMS 12.

The embodiment of the TMS 12 shown in FIG. 1, includes an air-cooled heat exchanger 18, through which an airflow 20 is directed. In some embodiments, the airflow 20 is urged through the heat exchanger 18 via, for example, a ram air fan 22, which is located at a downstream end 24 of the heat exchanger 18, opposite an upstream end 26 where the airflow 20 enters the heat exchanger 18. The TMS 12 includes a refrigerant circuit 28 through which a flow of refrigerant 30 is circulated. In some embodiments, the refrigerant is a dielectric refrigerant. The flow of refrigerant 30 is urged along the refrigerant circuit 28 via a pump 32. In some embodiments, excess refrigerant may be stored in a refrigerant reservoir 38 located between the heat exchanger 18 and the pump 32. In some embodiments, the TMS 12 may include a bypass passage 52 in which the flow of refrigerant 30 bypasses the refrigerant reservoir 38. The flow of refrigerant 30 is flowed through the electric motor 10 where the flow of refrigerant 30 is boiled by the heat of the electric motor 10. The boiled flow of refrigerant 30 exits the electric motor 10 and is flowed through the heat exchanger 18 and exchanges thermal energy with the airflow 20, returning the flow of refrigerant 30 to a sub-cooled liquid state. As the flow of refrigerant 30 flows through the electric motor 10, a vapor quality of the refrigerant will increase, with vapor quality a measure ranging from 0 (all liquid) to 1 (all vapor). In some embodiments, the vapor quality increases from 0 to 1, while in other embodiments the vapor quality may increase from 0 to 0.8 or from 0.2 to 0.8. It is to be appreciated, however, that these ranges are merely exemplary and the increase in vapor quality may fall into another range between 0 and 1.

Similarly, the flow of refrigerant 30 is directed through the motor drive 14, where the flow of refrigerant is boiled by the heat of the motor drive 14. The boiled flow of refrigerant 30 exits the motor drive 14 and is flowed through the heat exchanger 18 and exchanges thermal energy with the airflow 20, returning the flow of refrigerant 30 to a sub-cooled liquid state. In the embodiment of FIG. 1, the motor drive 14 and the electric motor 10 are arranged in a parallel arrangement, such that a first refrigerant flow portion 30a flows through the electric motor 10 and a second refrigerant flow portion 30b flows through the motor drive 14. The refrigerant flow 30 is split into flows 30a and 30b upstream of the electric motor 10 and the motor drive 14 by an input valve 34, and the flows 30a and 30b are rejoined downstream of the electric motor 10 and the motor drive 14 at an output valve 36. In some embodiments, the input valve 34 and the output valve 36 are three-way valves.

Figure 2:
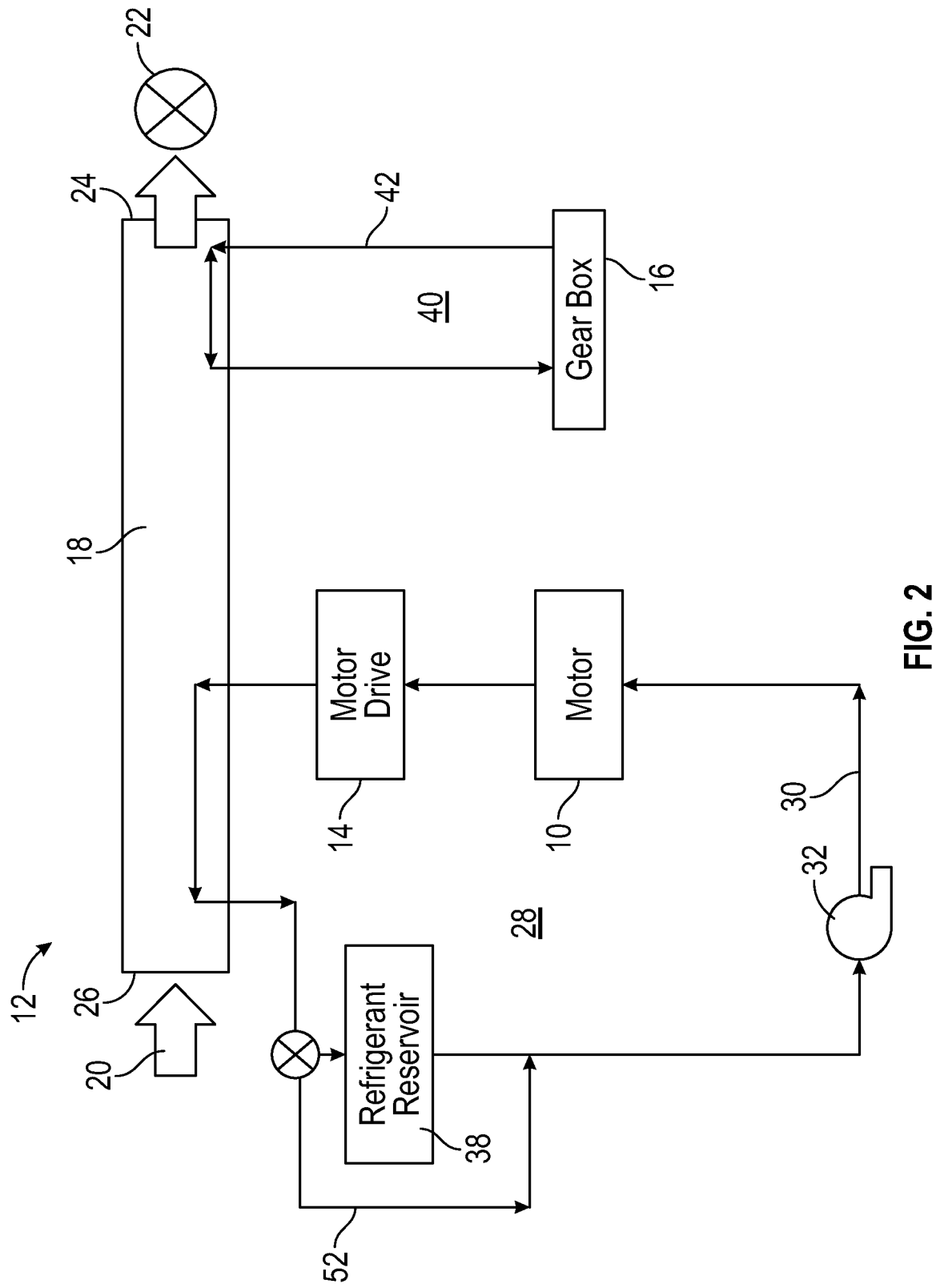
FIG. 2 is a schematic illustration of another embodiment of a thermal management system for an electric motor.
Figure 3:
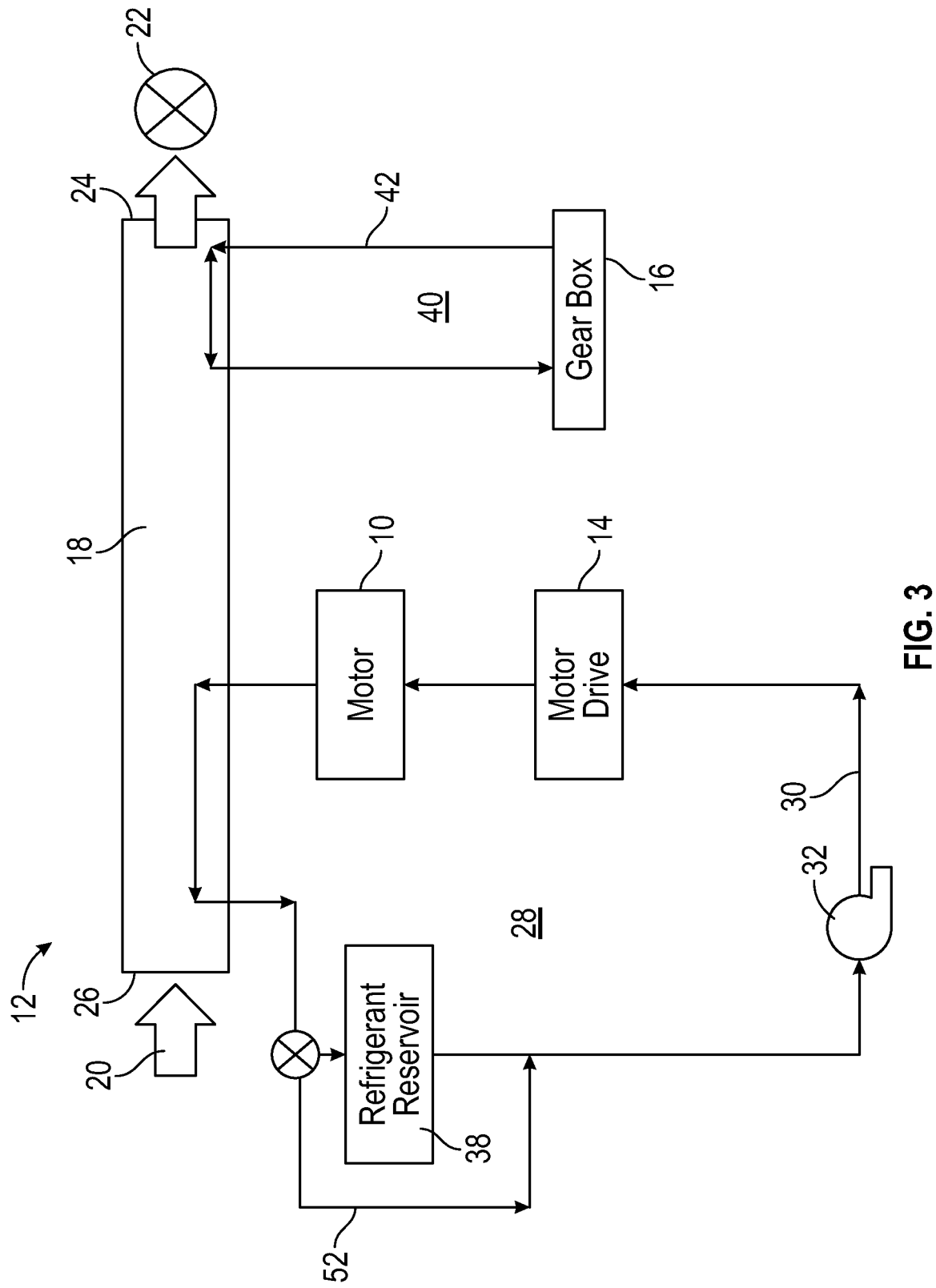
FIG. 3 is a schematic illustration of yet another embodiment of a thermal management system for an electric motor.

In other embodiments, such as shown in FIG. 2, the electric motor 10 and the motor drive 14 are arranged in series, such that the flow of refrigerant 30 flows first through the electric motor 10 and then through the motor drive 14, or alternatively first through the motor drive 14 and then through the electric motor 10, as shown in FIG. 3.

Figure 4:
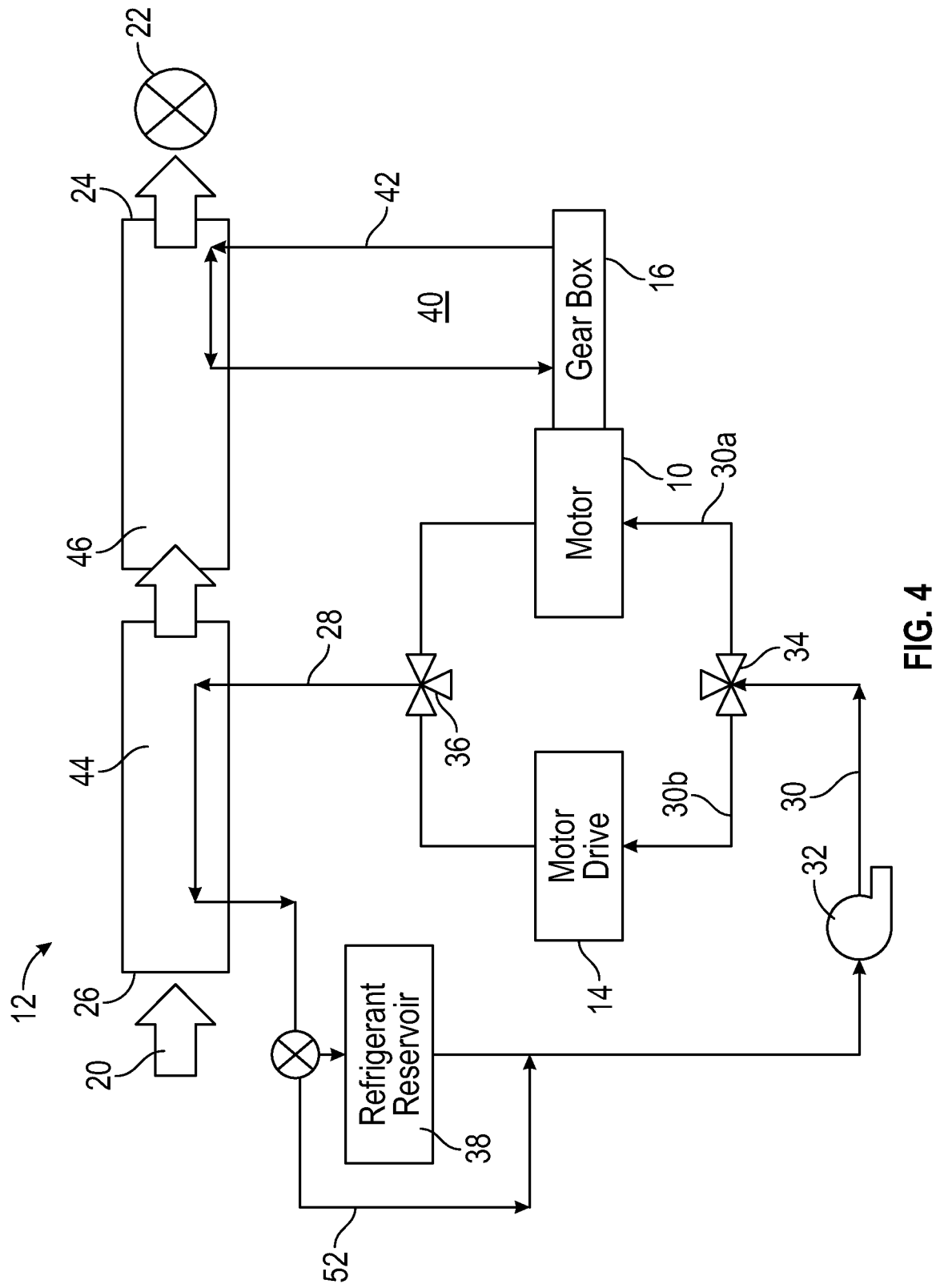
FIG. 4 is a schematic illustration of another embodiment of still another thermal management system for an electric motor.

Referring again to FIG. 1, the TMS 12 includes an oil circuit 40 fluidly connected to the gearbox 16. The oil circuit 40 circulates a flow of lubricant 42, such as oil, therethrough. The flow of lubricant 42 is heated by operation of the gearbox 16, and the heated flow of lubricant 42 is directed to the heat exchanger 18, where it is cooled via thermal energy exchange with the airflow 20. The cooled flow of lubricant 42 is directed back to the gearbox 16. While the embodiment of FIG. 1 utilizes a common heat exchanger 18 to cool both the flow of refrigerant 30 and the flow of lubricant 42, in other embodiments separate heat exchangers may be utilized. For example, as shown in FIG. 4, some embodiments may include an air-refrigerant heat exchanger 44 to cool the flow of refrigerant 30 and an air-lubricant heat exchanger 46 to cool the flow of lubricant 42.

Referring again to FIG. 1, the TMS 12 includes a controller 48. The controller 48 is connected to, for example, the pump 32, the input valve 34, the output valve 36, and one or more pressure and/or temperature sensors 50 to detect pressures and/or temperatures at various points of the TMS 12. For example, sensors 50 may be positioned at a refrigerant outlet of the electric motor 10, a refrigerant outlet of the motor drive 14 and a refrigerant outlet of the heat exchanger 18. Depending on the conditions detected by the sensors 50, the controller 48 controls operation of the pump 32, the input valve 34 and/or the output valve 36 to, for example, increase or decrease refrigerant flow rate or bias flow toward one of the electric motor 10 or motor drive 14. Such active control of the TMS 12 allows for increased efficiency of cooling the electric motor 10 and the motor drive 14.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electric motor system, comprising:
   an electric motor;
   and
   a thermal management system, comprising:
   a two-phase refrigerant circuit circulating a flow of refrigerant through the electric motor; and
   a refrigerant-air heat exchanger fluidly connected to the electric motor via the two-phase refrigerant circuit, such that the flow of refrigerant is boiled via heat generated by the electric motor, and returned to a subcooled liquid state to cool the electric motor;
   a motor drive operably connected to the electric motor and fluidly connected to the refrigerant-air heat exchanger via the two-phase refrigerant circuit such that the flow of refrigerant cools the motor drive;
   one or more sensors disposed along the two-phase refrigerant circuit to detect one or more flow conditions of the flow of refrigerant;
   one or more valves configured to regulate the flow of refrigerant through the electric motor and the motor drive; and
   a controller operably connected to the one or more sensors and the one or more valves, the controller configured to operate the one or more valves in response to the detected one or more flow conditions.

2. The electric motor system of claim 1, wherein the electric motor and the motor drive are fluidly connected to the two-phase refrigerant in a parallel relationship.

3. The electric motor system of claim 1, wherein the electric motor and the motor drive are fluidly connected to the two-phase refrigerant in a serial relationship.

4. The electric motor of claim 1, wherein the one or more flow conditions include one or more of temperature or pressure of the flow of refrigerant.

5. The electric motor system of claim 1, further comprising:
   a gear box operably connected to the electric motor; and
   a lubricant circuit circulating a flow of lubricant through the gear box; and
   wherein the lubricant circuit circulates the flow of lubricant through the refrigerant-air heat exchanger, such that the flow of lubricant is cooled at the refrigerant-air heat exchanger prior to being returned to the gear box.

6. The electric motor system of claim 1, further comprising a refrigerant reservoir disposed along the refrigerant circuit downstream of the refrigerant-air heat exchanger.

7. The electric motor system of claim 6, further comprising a bypass passage allowing for selective bypass of the refrigerant reservoir by the flow of refrigerant.

8. The electric motor system of claim 1, wherein the flow of refrigerant is a dielectric refrigerant.

9. A method of dissipating thermal energy from an electric motor, comprising:
   urging a flow of refrigerant through an electric motor, thereby boiling the flow of refrigerant;
   directing the flow of refrigerant from the electric motor to a refrigerant-air heat exchanger via a two-phase refrigerant circuit;
   cooling the refrigerant to a sub-cooled liquid state at the refrigerant-air heat exchanger via thermal energy exchange with a flow of air through the refrigerant-air heat exchanger;
   directing at least a portion of the flow of refrigerant through a motor drive operably connected to the electric motor and fluidly connected to the refrigerant-air heat exchanger via the two-phase refrigerant circuit such that the flow of refrigerant cools the motor drive;
   detecting one or more flow conditions of the flow of refrigerant via one or more sensors disposed along the two-phase refrigerant circuit; and
   operating one or more valves configured to regulate the flow of refrigerant through the electric motor and the motor drive based on the one or more flow conditions.

10. The method of claim 9 wherein the electric motor and the motor drive are fluidly connected to the two-phase refrigerant circuit in a parallel relationship.

11. The method of claim 9, wherein the one or more flow conditions are one or more of pressure or temperature of the flow of refrigerant.

12. The method of claim 9, further comprising:
    flowing a flow of lubricant through a gear box operably connected to the electric motor;
    directing the flow of lubricant from the gear box to the refrigerant-air heat exchanger via a lubricant circuit; and
    cooling the lubricant at the refrigerant-air heat exchanger via thermal energy exchange with a flow of air through the refrigerant-air heat exchanger.

13. A thermal management system for an electric motor system, comprising:
    a refrigerant-air heat exchanger;
    a two-phase refrigerant circuit fluidly connected to the refrigerant-air heat exchanger and to an electric motor, a flow of refrigerant circulating through the refrigerant circuit to cool the electric motor;
    a lubricant circuit fluidly connected to the refrigerant-air heat exchanger and to a gear box operably connected to the electric motor, a flow of lubricant circulating through the lubricant circuit cooled at the refrigerant-air heat exchanger;
    one or more sensors disposed along the two-phase refrigerant circuit to detect one or more flow conditions of the flow of refrigerant;
    one or more valves configured to regulate the flow of refrigerant through the electric motor and the motor drive; and
    a controller operably connected to the one or more sensors and the one or more valves, the controller configured to operate the one or more valves in response to the detected one or more flow conditions.

14. The thermal management system of claim 13, wherein the two-phase refrigerant circuit is fluidly connected to a motor drive operably connected to the electric motor, at least a portion of the flow of refrigerant directed through the motor drive to cool the motor drive.

15. The thermal management system of claim 13, wherein the one or more flow conditions include one or more of temperature or pressure of the flow of refrigerant.

\* \* \* \* \*